(12) United States Patent
Mueller

(10) Patent No.: US 6,826,339 B1
(45) Date of Patent: Nov. 30, 2004

(54) ELECTROMAGNETICALLY INDUCED TRANSPARENT (EIT) PHOTONIC BAND-GAP FIBERS

(75) Inventor: Dirk Mueller, Lafayette, CO (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/714,297

(22) Filed: Nov. 14, 2003

(51) Int. Cl.[7] .............................. G02B 6/00; C03B 37/02
(52) U.S. Cl. ..................... 385/122; 385/123; 385/125; 385/126; 65/393; 65/401
(58) Field of Search ................ 385/122, 123, 385/141, 15, 16, 17, 18, 24, 125, 126; 65/393, 401

(56) References Cited

U.S. PATENT DOCUMENTS

| | | | |
|---|---|---|---|
| 6,243,522 B1 | 6/2001 | Allan et al. ................. | 385/123 |
| 6,260,388 B1 | 7/2001 | Borrelli et al. ............... | 65/393 |
| 6,426,831 B1 * | 7/2002 | Schmidt et al. ............. | 359/326 |
| 6,444,133 B1 | 9/2002 | Fajardo et al. ................ | 216/24 |
| 6,445,862 B1 | 9/2002 | Fajardo et al. .............. | 385/125 |
| 6,456,416 B1 * | 9/2002 | Ichimura et al. ............ | 359/241 |
| 6,496,632 B2 | 12/2002 | Borrelli et al. ............. | 385/123 |
| 2003/0133641 A1 * | 7/2003 | Yoo ............................ | 385/14 |

* cited by examiner

Primary Examiner—Brian M. Healy
(74) Attorney, Agent, or Firm—Harness, Dickey & Pierce P.L.C.; Gregory V. Bean

(57) ABSTRACT

An electromagnetically induced transparent (EIT) photonic band-gap fiber (PBG). The EIT-PBG combines the pass gap and band gap properties of a photonic band gap (PBG) fiber with the transparency control of mediums exhibiting EIT effects, allowing the formation of various optical devices.

24 Claims, 4 Drawing Sheets

ELECTROMAGNETICALLY INDUCED TRANSPARENT (EIT) PHOTONIC BAND-GAP FIBERS

FIELD OF THE INVENTION

The present invention relates to electromagnetically induced transparency in photonic band-gap structures. More particularly, the present invention relates to the use of physical and modal characteristics of photonic band-gap fibers to support the use of electromagnetically induced transparency in an injected medium.

BACKGROUND OF THE INVENTION

A photonic crystal is a structure having a multi-dimensional periodic variation of the dielectric constant, resulting in a band gap structure. Electromagnetic wavelengths within the band gap may have reduced transmission, and electromagnetic wavelengths above and below the band gap may have increased transmission.

Introducing defects into the periodic variation of the photonic crystal, resulting in variations of the dielectric constant, can alter allowed or non-allowed light wavelengths which can propagate in the crystal. Light which cannot propagate in the photonic crystal but can propagate in the defect region can be trapped in the defect region. A particular line defect in a three dimensional photonic crystal can act as a waveguide channel, for light wavelengths in the band gap.

Optical waveguide fibers can be generally classified into single-mode fiber and multimode fiber. Both types of optical fiber rely on total internal reflection (TIR) for guiding the photons along the fiber core. Typically, the core diameter of single-mode fiber is relatively small, thus allowing only a single mode of light wavelengths to propagate along the waveguide. Single-mode fibers can generally provide higher bandwidth because the light pulses can be spaced closer together, and are less affected by dispersion along the fiber. Additionally, the rate of power attenuation for the propagating light is lower in a single-mode fiber. Optical fibers which maintain their single mode characteristics for all wavelengths are defined as endlessly single mode fibers.

Optical fibers having a larger core diameter are generally classified as multimode fibers, and allow multiple modes of light wavelengths to propagate along the waveguide. The multiple modes travel at different velocities. This difference in group velocities of the modes results in different travel times, causing a broadening of the light pulses propagating along the waveguide. This effect is referred to as modal dispersion, and limits the speed at which the pulses can be transmitted; in turn limiting the bandwidth of multimode fiber. Graded-index multimode fiber (as opposed to step-index multimode fiber) has been developed to limit the effects of modal dispersion. However, current multimode and graded-index multimode fiber designs do not have the bandwidth capabilities of single-mode fiber.

Photonic crystals are another means by which photons (light modes) can be guided through an optical waveguide structure in multi-mode states. Rather than guiding photons using TIR, photonic crystals rely on Bragg scattering for guiding the light. The characteristic defining a photonic crystal structure is the periodicity of dielectric material along one or more axes. When the dielectric constants of the materials forming the lattice are different; and the material absorbs minimal light, the effects of scattering and Bragg diffraction at the lattice interfaces allow the photons to be guided along or through the photonic crystal structure. FIG. 1 shows a conventional photonic crystal having three photonic band gaps; the allowed frequencies of transmission are above and below each gap.

Electromagnetically induced transparency (EIT) is the effect of making a medium previously opaque or dispersive to an incident laser, partially transparent. A classical explanation is that the electrons in the medium are induced to have little motion at the frequencies of the intended transparent laser light. This can be accomplished by sinusoidal forces offset in phase reducing the motion of the electrons. The motion of the electrons is reflected in the dielectric constant of the medium and reducing the motion effects the dielectric constant at the frequency of interest.

FIG. 2 illustrates one possible example of EIT with respect to three energy state levels, $|n\rangle$, $|n+1\rangle$, and $|n+2\rangle$, of an atom in the medium of interest. The atom oscillates between the energy states at the Rabi frequency (the electrons move between energy state levels). Experimentally the coupling laser frequency (wavelength $\lambda_C$) is held fixed, while the probing laser frequency (wavelength $\lambda_P$) is varied. The transmission of the probing frequency through the medium, having the energy levels shown in FIG. 2, is measured and at particular probing frequencies the transmission increases substantially. The increase in transmission is usually defined by a transparency width within which the probing wavelength enjoys increased transmission. Typically the condition exists that the probing laser's linewidth (wavelength extent) be small compared to the transparency width.

An example of an electromagnetic induced transparency can be seen in FIGS. 3A and 3B. FIG. 3A illustrates the transmission percentage (%) of a probing laser as a function of the probing laser wavelength, without a coupling laser. FIG. 3B illustrates the transmission % of the probing laser with a coupling laser set to a fixed frequency. With the coupling laser a significant increase in transmission occurs in regions previously devoid of transmission.

Presently the effects of EIT can only be demonstrated under difficult experimental conditions. To obtain a lower resonance line width (the width of the probing laser wavelengths within which transmission increases) the medium must be cooled to near-zero temperatures. Alternatively if the medium is not cooled, a larger resonance line width must be tolerated, which usually requires a large intensity coupling laser.

SUMMARY OF THE INVENTION

Exemplary embodiments of the present invention provide methods and devices for the use of electromagnetically induced transparency.

Exemplary embodiments of the present invention provide the use of electromagnetically induced transparency in photonic band gap structures.

Exemplary embodiments of the present invention provide the use of electromagnetically induced transparency in a medium injected into a photonic band gap fiber.

Further areas of applicability of exemplary embodiments of the present invention will become apparent from the detailed description provided hereinafter. It should be understood that the detailed description and specific examples, while indicating exemplary embodiments of the invention, are intended for purposes of illustration only and are not intended to limited the scope of the invention.

BRIEF DESCRIPTION OF THE DRAWINGS

Exemplary embodiments of present invention will become more fully understood from the detailed description and the accompanying drawings, wherein.

DETAILED DESCRIPTION OF EXEMPLARY EMBODIMENTS OF THE PRESENT INVENTION

The following description of exemplary embodiments is merely illustrative in nature and is in no way intended to limit the invention, its application, or uses.

Exemplary embodiments of the present invention utilize a medium exhibiting EIT effects when illuminated by a coupling laser in portions of a PBG. In exemplary embodiments of the present invention, a coupling laser is used to manipulate the passage and characteristics of a probing laser through the PBG.

Figure 4:
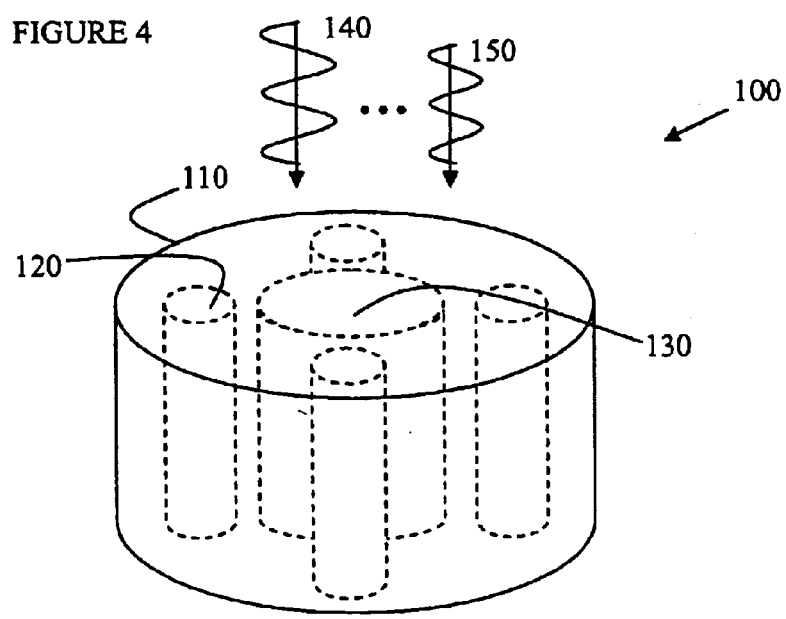
FIG. 4 is a illustration of a PBG fiber in accordance with an exemplary embodiment of the present invention.

FIG. 4 illustrates a PBG fiber 100 in accordance with an exemplary embodiment of the present invention. A coupling laser 150 having a coupling wavelength (and coupling frequency) $\lambda_c$ illuminates an end of the PBG fiber 100. The coupling laser 150 modifies various energy levels of the medium inside various portions of the PBG fiber 100, allowing an increased transmission at certain frequencies (the EIT effect) within a transparency width. A probing laser 140 is chosen to have a probing wavelength $\lambda_p$ (and probing frequency) and/or bandwidth (transmission linewidth) within the transparency width. The PBG fiber 100 shown in FIG. 4 can have a first medium 110 of a first index of refraction and several other portions having various indices of refraction, for example column 120 can be comprised of a second medium with a second index of refraction and column 130 (often described as the core) can be composed of a third medium with a third index of refraction. The first medium can be exposed to a background medium. The first, second, and third mediums are chosen so that the PBG fiber 100 exhibits properties allowing certain frequencies to pass through the PBG fiber 100 (often referred to as pass gap frequencies), and prohibit other frequencies, within a band gap, from passing through the PBG fiber 100. The second and/or third mediums can be partially exposed to the background medium. In exemplary embodiments of the present invention the probing laser and/or the coupling laser frequencies can lie within the pass-gap frequencies. Although three mediums are shown, any number of media may be used to construct a PBG fiber in accordance with exemplary embodiments of the present invention.

In additional exemplary embodiments of the present invention the second and/or third mediums may be fluids and/or gases that fill cavities in the PBG fiber. If the second and/or third mediums are fluids and/or gases in cavities, then during fabrication the ends of the respective mediums are sealed to prevent leakage out of the cavities The fluids and/or gases are chosen such that they exhibit an increased transmission at the probing frequency when illuminated at a coupling frequency.

Figure 5:
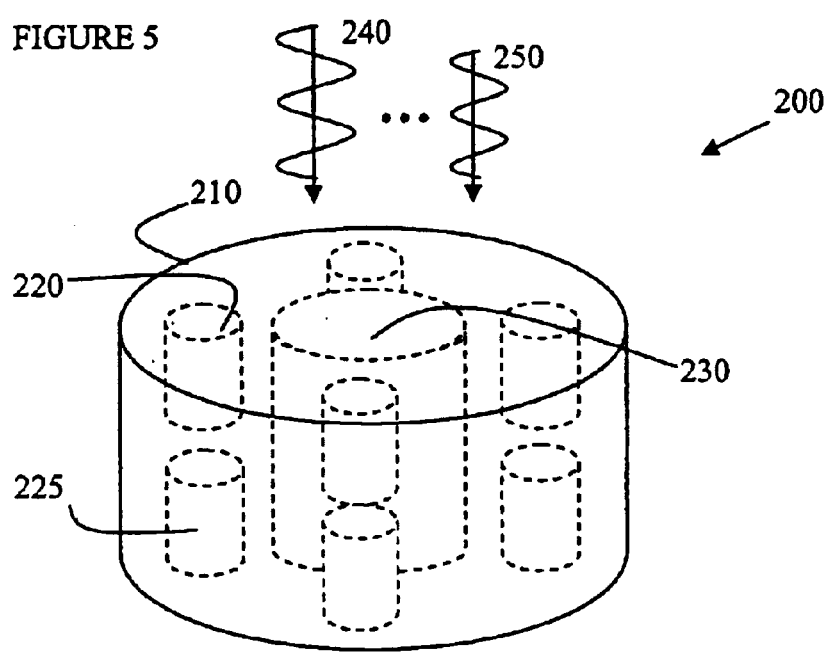
FIG. 5 is a illustration of a PBG fiber in accordance with another exemplary embodiment of the present invention.

FIG. 5 illustrates a PBG fiber 200 in accordance with another exemplary embodiment of the present invention. PBG fiber 200 is illuminated by a coupling laser 250 with a coupling frequency, and a probing laser 240 with a probing frequency. In various exemplary embodiments of the present invention the probing 240 and coupling laser 250 can produce light simultaneously, in pulsed states, out of phase, with only one laser used, with one laser continuous and one pulsed or any other combination. The scope of exemplary embodiments of the present invention should not be interpreted to be limited by the operational use of the lasers with respect to each other.

FIG. 5 illustrates the PBG fiber 200 having three mediums where one of the mediums is produced in isolated blocks within the first medium 210. As illustrated, the second medium 230 is surrounded by columns of a third medium that have been separated into isolated chambers 220 and 225. The chambers 220 and 225 may be repeated along the length of PBG fiber 200.

Figure 1:
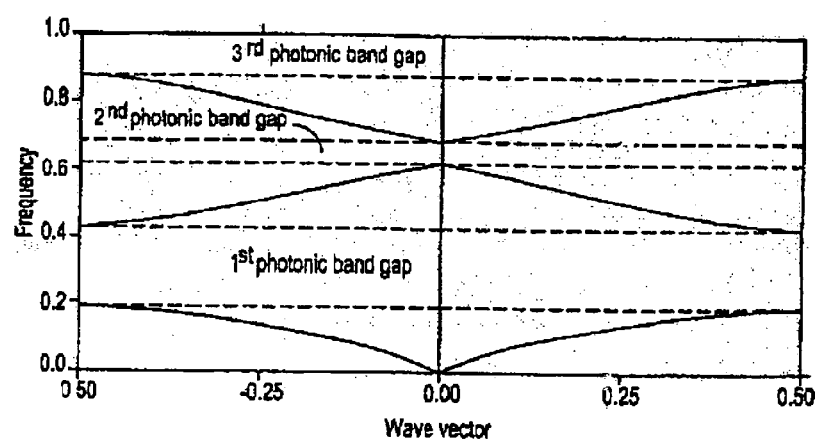
FIG. 1 is a chart showing the pass bands and band gaps of a conventional photonic crystal.
Figure 2:
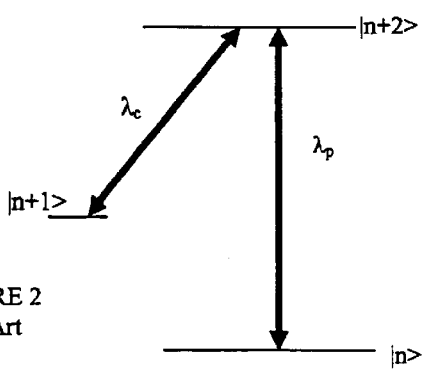
FIG. 2 is an illustration of conventional multi-level energy states in an atom.
Figure 3A:
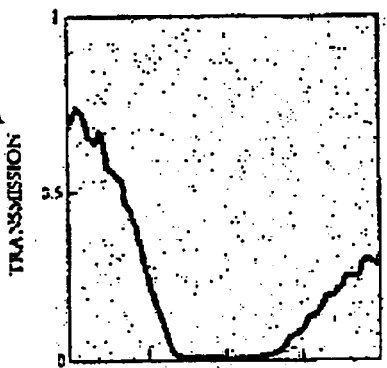
FIGS. 3A and 3B illustrate an example of experimental data showing the effect of electromagnetic induced transparency.
Figure 3B:
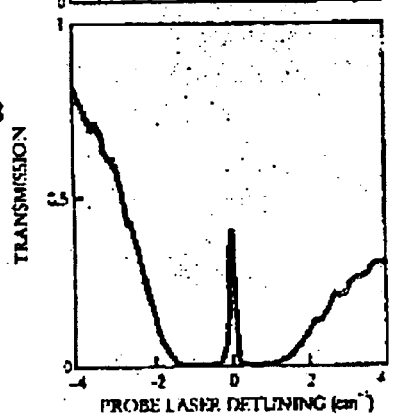

In exemplary embodiments of the present invention, each of the chambers can be, filled with a solid, fluid, or gas. If filled with fluids and gases the individual chambers 220 and/or 225 can be pressurized such that the pressures in the chambers 220 and/or 225 are different than the pressure in the environment surrounding the PBG fiber 200. The pressures can be changed to increase the EIT effect within the chambers 220 and/or 225 when illuminated by the coupling and probing lasers 250 and 240, respectively. The pressures can be lower, higher, or the same with respect to each chamber 220 and 225 and the environment surrounding the PBG fiber 200. Examples of media that can fill the chambers are mediums exhibiting EIT effects when illuminated by a coupling laser. For example gases having a three level narrow optical transition, as described above with respect to FIG. 2, can be used for filling chambers 220 and/or 225.

In exemplary embodiments the index of refraction of the chambers are less than the index of refraction for the first medium.

The chambers 220 and 225 can be created by using a fiber that has been drawn forming column chambers of full fiber length, then heating periodic sections to cause a reflow process at the heated points closing off the chambers at those points forming periodic isolated chambers. One of ordinary skill in the art could devise additional methods to form the isolated chambers using known techniques. Exemplary embodiments of the present invention should not be interpreted as being limited to particular methods of forming the isolated chambers.

One exemplary method of generating a PBG in accordance with an embodiment of the present invention is to extrude through a die a material comprising at least one glass powder and a binder to form a body having a first face spaced apart from a second face. Each face has an area, where a plurality of channels extend from the first to the second face and form openings in the respective faces. In embodiments where isolated chambers contain filled mediums that can exhibit EIT effects, there need not be any openings formed on the first or second face. The channels may be separated one from another by intervening walls which have a cross section, the cross section of the walls serving to separate the array of openings, one from another, in the respective faces. The body may be heated driving off the binder and viscously sintering the glass powder to form a glass body. A glass fiber or rod may be drawn from the glass body forming channels in the glass body. The channels may be filled with a medium that exhibits EIT when illuminated by a coupling laser of wavelength $\lambda_c$ and the channels sealed. In additional exemplary embodiments of the present invention, the body containing the channels may be periodically heated at periodic lengths to cause reflow and sealing of the channels to form isolated chambers that are filled with the medium. Other methods of forming isolated or sealed channels are intended to fall within the scope of the present invention. For example, another method of forming isolated chambers would be to insert at periodic lengths within the channels a sealant substance that either cures in place or hardens when heated forming the walls of isolated chambers.

Figure 6:
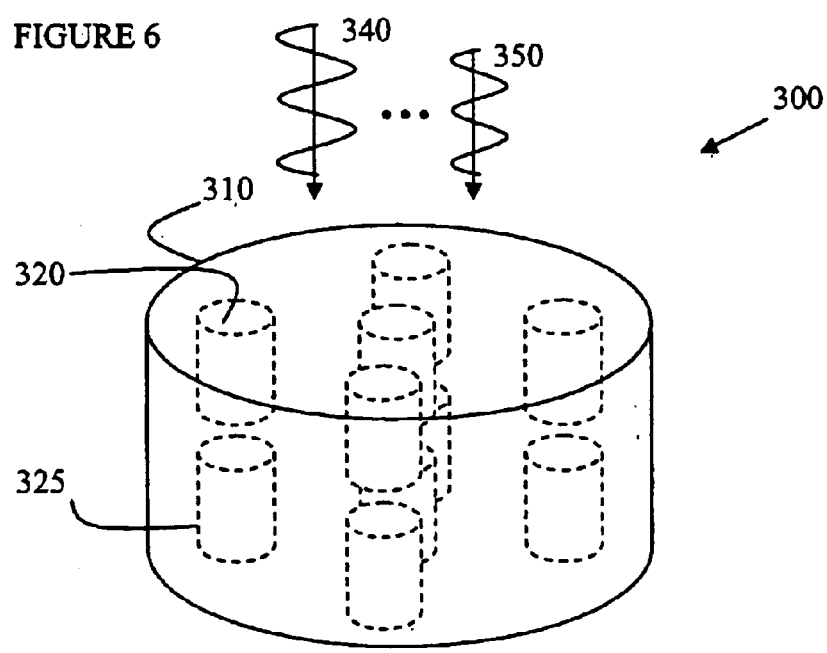
FIG. 6 is a illustration of a PBG fiber in accordance with another exemplary embodiment of the present invention.

FIG. 6 shows yet another variation of a PBG fiber 300 configuration in accordance with exemplary embodiments of the present invention. A probing laser 340 and a coupling laser 350 can illuminate the PBG fiber 300. The PBG fiber 300 is composed of a first medium 310, and a second medium separated into chambers 320 and 325. In this variation the isolated chambers 320 and 325 repeat themselves throughout the PBG fiber 300 and are surrounded by the first medium 310. Various other configurations of chambers and mediums are intended to lie within the scope of the present invention.

PBG fibers in accordance with embodiments of the present invention can provide guided coupling wavelength modal field intensity levels needed for non-cooled EIT effects. Additionally the PBG fibers allow overlap of the laser signals having coupling and probing frequencies within the fiber and the signals do not diverge within the PBG and can interact with the medium exhibiting EIT effects continuously.

Figure 7A:
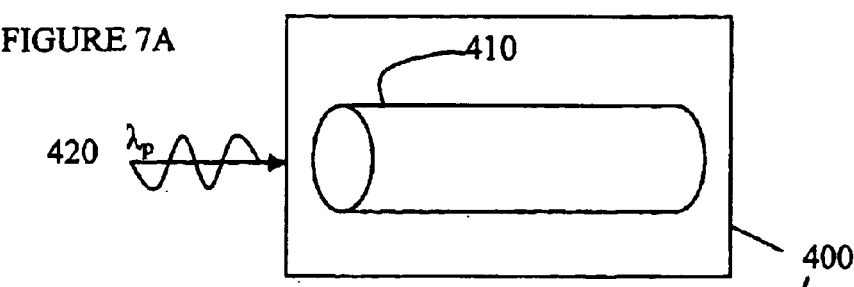
FIGS. 7A and 7B illustrate a switch and/or optical fiber in accordance with exemplary embodiments of the present invention.
Figure 7B:
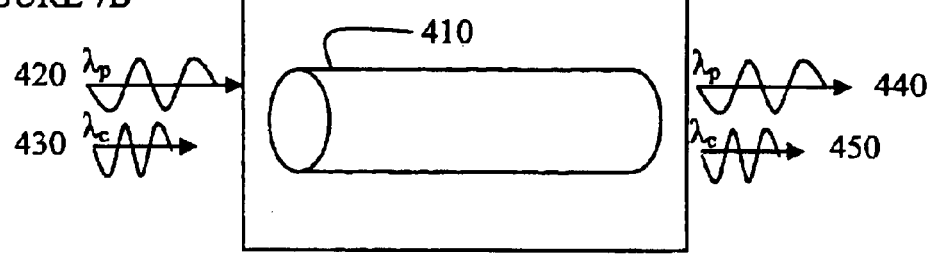

Exemplary embodiments of the present invention include utilization of the PBG fiber and the EIT effect to construct various devices. One of ordinary skill in the art would be able to use the disclosure of the present invention and the discussed PBG fibers and coupling and probing lasers to construct devices using the EIT effect in the PBG fiber for various functions in accordance with exemplary embodiments of the present invention. For example FIGS. 7A and 7B illustrate one possible use of PBG fiber, having EIT characteristics, as an optical switch 400, in accordance with exemplary embodiments of the present invention.

The optical switch 400 is composed of a PBG fiber in accordance with discussions above, having an EIT transparency width W. A signal carried by the probing laser 420 has a probing frequency within the pass gap frequencies but the medium through which the signal travels is opaque to the particular probing frequency. Thus no signal flows through the optical switch 400. Upon the illumination of the optical switch 400 with a coupling laser 430, the medium exhibits EIT effects and the transmission at probing frequencies increases allowing the signal formed by the probing laser 420 to pass through the optical switch 400 exiting as a transmission signal 440. The transmission signal 440 may experience dispersion and intensity variations when compared to the original signal generated by the probing laser 420. The coupling laser also may pass through, exiting the optical switch 400 as a transmitted coupling signal 450, which may also experience dispersion and intensity variations. Additional devices can be formed using embodiments of the present invention, e.g., phase shifters, Boolean operators, wavelength fibers, . . . All devices using a PBG having mediums which carry the pass gap frequencies that exhibit EIT effects are additionally intended to fall within the scope of the present invention.

The description of the invention is merely exemplary in nature and, thus, variations that do not depart from the gist of the invention are intended to be within the scope of the embodiments of the present invention. Such variations are not to be regarded as a departure from the spirit and scope of the present invention. For example the configuration of the PBG fiber should not be interpreted to be limited to the arrangements shown in FIGS. 4–6.

What is claimed is:

1. A waveguide fiber comprising:
   a first medium, exhibiting electromagnetic induced transparency; and
   a second medium, wherein the first and second mediums form a fiber having a photonic band gap structure, wherein the first medium has a low first frequency signal transmission and where illumination of the waveguide by a second frequency signal increases the transmission of the first frequency signal.

2. The waveguide according to claim 1, wherein empty chambers are formed in the second medium.

3. The waveguide according to claim 2, wherein the chambers are filled with fluid forming the first medium, the first medium having EIT effects at a coupling frequency.

4. The waveguide according to claim 2, wherein the chambers are filled with a gas forming the first medium, the first medium having EIT effects at a coupling frequency.

5. The waveguide according to claim 4, wherein the gas is pressurized.

6. The waveguide according to claim 1, wherein the waveguide produces dispersion altering characteristics on the first frequency signal.

7. The fiber according to claim 1, wherein the second medium is made of glass.

8. An optical switch comprising:
   a PBG fiber, wherein the PBG fiber has a first medium exhibiting electromagnetic induced transparency and a second medium, wherein the first and second mediums form a fiber having a photonic band gar structure;
   an input, wherein said input accepts a switching signal and a first signal, and
   an output, wherein said output transmits a portion of the first signal in response to the switching signal, and wherein the first medium has a low first signal transmission and where illumination of the PBG fiber by the switching signal increases the transmission of the first signal from the output.

9. The optical switch according to claim 8, wherein empty chambers are formed in the second medium.

10. The optical switch according to claim 9, wherein the chambers are filled with fluid forming the first medium, the first medium having EIT effects at a coupling frequency.

11. The optical switch according to claim 9, wherein the chambers are filled with a gas forming the first medium, the first medium having EIT effects at a coupling frequency.

12. The optical switch according to claim 11, wherein the gas is pressurized.

13. The optical switch according to claim 8, wherein the optical switch produces dispersion altering characteristics on the first signal.

14. The optical switch according to claim 8, wherein the second medium is made of glass.

15. The optical switch according to claim 8, wherein the optical switch is used to perform a Boolean operation, where the input of the first signal without the switching signal corresponds to a low transmission of the first signal from the output corresponding to a logical value "0" and the input of the first signal and the switching signal corresponds to a higher relative transmission of the first signal from the output corresponding to the logical value "1."

16. A method of selecting transmission of a signal comprising:

passing a transmission signal into a fiber, the fiber having a photonic band gap structure, and exhibiting electromagnetically induced transparency in a transparency frequency width W when illuminated by a coupling signal having a coupling frequency, the transmission signal having a frequency within the width W;

passing a switching signal thru the fiber; and selecting the transmission signal for transmission thru the fiber, where the selecting occurs by setting the switching signal's frequency to the coupling frequency.

17. The method according to claim 16, wherein the switching signal and transmission signal frequencies lie in a pass band frequency range of the photonic band gap structure.

18. The method according to claim 17, wherein a plurality of signals are selected to pass through the waveguide as transmission signals.

19. A method of making an EIT supportive photonic fiber comprising:

extruding through a die a material comprising at least one glass powder and a binder to form a body having a first face spaced apart from a second face, each face having an area, wherein a plurality of channels extend from the first to the second face and form openings in the respective faces, the channels separated one from another by intervening walls which have a cross section, the cross section of the walls serving to separate the array of openings, one from another, in the respective faces;

heating the body to drive off the binder and viscously sinter the glass powder to form a glass body;

drawing a glass fiber or rod from the glass body forming channels in the glass body;

filing the channels with a medium that exhibits EIT when illuminated by a coupling laser of wavelength $\lambda_c$; and sealing the channels.

20. The method of claim 19, wherein the channels form a periodic array of chambers isolated within the glass.

21. The method of claim 19, wherein the medium is fluid.

22. The method of claim 19, wherein the medium is gas.

23. The method of claim 19, wherein the chambers are formed by heating at periodic spacings along the waveguide causing reflow closing the channels at periodic locations forming the periodic array of chambers.

24. The method of claim 19, wherein the chambers are formed by periodic placement of a sealant substance in the channels, where upon heating, the sealant substance forms sealing walls of the chambers.

* * * * *